United States Patent
Nett et al.

(10) Patent No.: US 7,878,936 B2
(45) Date of Patent: Feb. 1, 2011

(54) DRIVE TRAIN FOR A MOTOR VEHICLE AND POWER DIVIDER THEREFOR

(75) Inventors: Hans-Peter Nett, Adenau (DE); Jan Haupt, Cologne (DE)

(73) Assignee: GETRAG Driveline Systems GmbH, Cologne (DE)

( * ) Notice: Subject to any disclaimer, the term of this patent is extended or adjusted under 35 U.S.C. 154(b) by 0 days.

(21) Appl. No.: 12/235,365

(22) Filed: Sep. 22, 2008

(65) Prior Publication Data

US 2009/0075776 A1    Mar. 19, 2009

Related U.S. Application Data

(60) Division of application No. 11/528,845, filed on Sep. 28, 2006, now Pat. No. 7,485,063, which is a continuation of application No. PCT/EP2005/002999, filed on Mar. 22, 2005.

(30) Foreign Application Priority Data

Mar. 30, 2004  (DE) ....................... 10 2004 016 642
Sep. 16, 2004  (DE) ....................... 10 2004 046 009

(51) Int. Cl.
*F16H 48/20* (2006.01)
*F16H 37/08* (2006.01)
*B60K 17/354* (2006.01)

(52) U.S. Cl. .................. 475/223; 475/200; 180/247

(58) Field of Classification Search .................. 475/200, 475/202, 221, 222, 223; 180/233, 247, 248; 74/416, 417, 424, 665 F, 665 GB
See application file for complete search history.

(56) References Cited

U.S. PATENT DOCUMENTS

| 2,267,562 | A | * | 12/1941 | Higgins | ........................ 180/24 |
| 4,476,953 | A | | 10/1984 | Hiraiwa | |
| 4,523,493 | A | * | 6/1985 | Weiss | .......................... 475/205 |
| 4,711,318 | A | | 12/1987 | Kitade | |

(Continued)

FOREIGN PATENT DOCUMENTS

DE    37 21 628 C2    6/1987

(Continued)

OTHER PUBLICATIONS

International Preliminary Report of Patentability, Nov. 9, 2006, International Application No. PCT/EP2005/002999.

*Primary Examiner*—Roger Pang
(74) *Attorney, Agent, or Firm*—Knobbe, Martens, Olson & Bear, LLP

(57) ABSTRACT

A drive train for a motor vehicle, which has a front axle and a rear axle, of which one is driven constantly and the other is driven as required, with a drive unit which is installed in the motor vehicle transversely at the front and provides drive torque via an output member, the output member being connected to the constantly driven axle, with an angular gear which is arranged in the region of the front axle and is connected to a cardan shaft which serves for transferring drive torque to the rear axle, and with a friction clutch arrangement for cutting in the axle driven as required, wherein the friction clutch arrangement is integrated with the angular gear in the region of the front axle.

6 Claims, 3 Drawing Sheets

U.S. PATENT DOCUMENTS

| | | | |
|---|---|---|---|
| 4,763,748 A * | 8/1988 | Miura et al. | 180/248 |
| 4,862,769 A * | 9/1989 | Koga et al. | 475/86 |
| 4,875,698 A * | 10/1989 | Uchiyama | 180/233 |
| 4,911,260 A | 3/1990 | Miura et al. | |
| 4,912,639 A | 3/1990 | Kawamoto et al. | |
| 5,167,293 A | 12/1992 | Park et al. | |
| 5,193,639 A | 3/1993 | Hara et al. | |
| 5,246,408 A | 9/1993 | Kobayashi | |
| 5,248,284 A | 9/1993 | Kobayashi et al. | |
| 5,254,052 A | 10/1993 | Kobayashi | |
| 5,267,914 A | 12/1993 | Eastman et al. | |
| 5,547,430 A | 8/1996 | Gasch | |
| 6,019,695 A | 2/2000 | Kobayashi | |
| 6,105,703 A | 8/2000 | Kuroda et al. | |
| 6,135,229 A | 10/2000 | Arimatsu | |
| 6,620,071 B1 | 9/2003 | Cook et al. | |
| 6,935,983 B2 | 8/2005 | Pecnik | |
| 7,232,398 B2 * | 6/2007 | Garcia et al. | 475/222 |
| 2003/0037986 A1 | 2/2003 | Gansloser et al. | |

FOREIGN PATENT DOCUMENTS

| | | |
|---|---|---|
| DE | 44 09 224 A1 | 3/1994 |
| DE | 43 08 268 C1 | 3/1996 |
| DE | 103 13 386 A1 | 3/2003 |
| DE | 699 11 541 T2 | 4/2004 |
| EP | 0 395 247 | 10/1990 |
| EP | 1 279 546 A2 | 1/2003 |
| JP | 62244715 | 10/1987 |
| JP | 002037036 | 2/1990 |
| JP | 02258426 | 10/1990 |
| WO | WO 02/28678 A1 | 4/2002 |

* cited by examiner

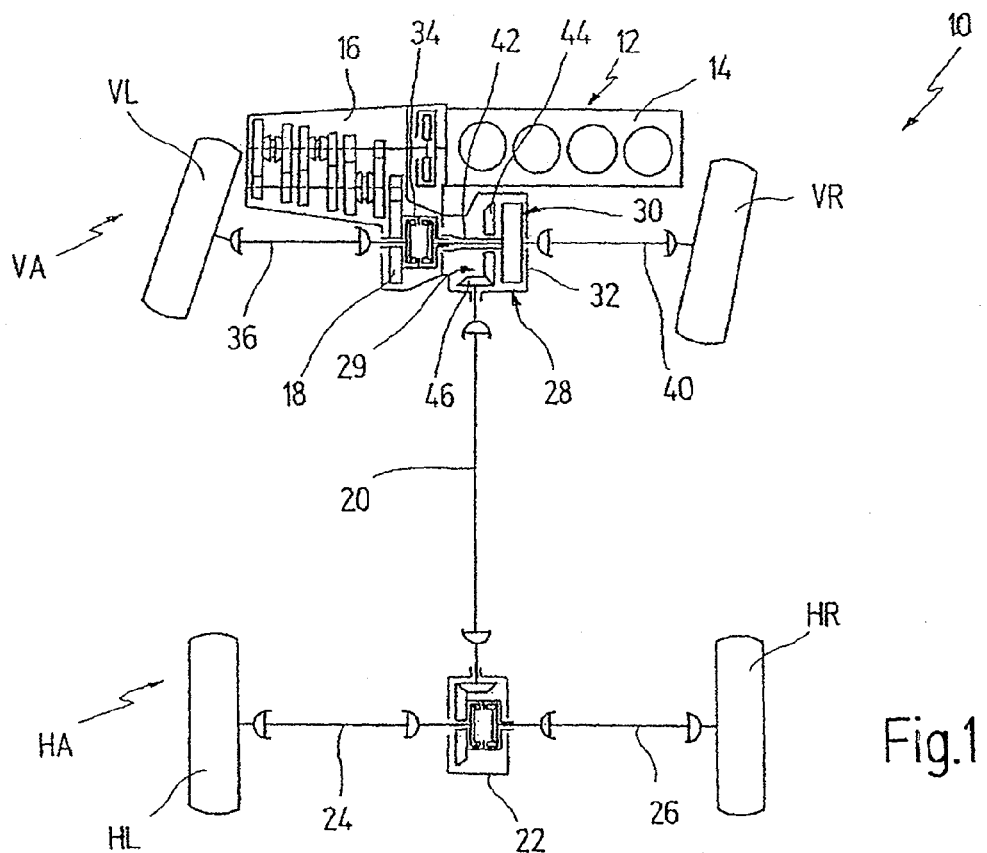
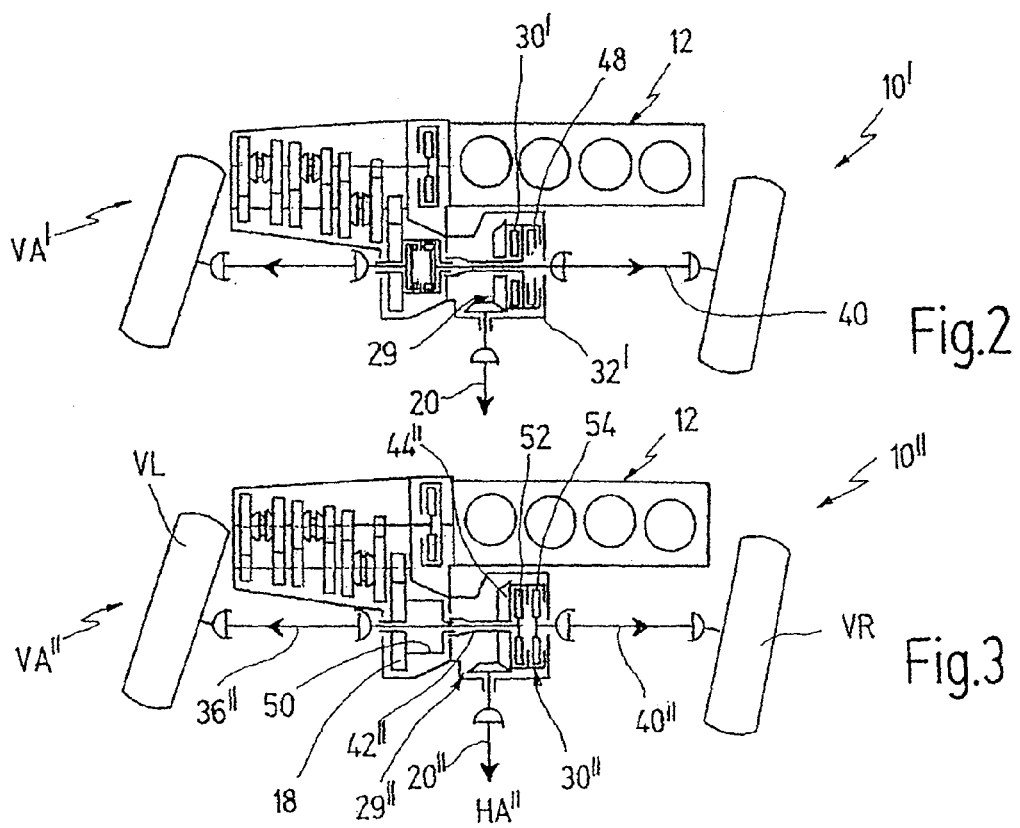
Fig.1
Fig.2
Fig.3

DRIVE TRAIN FOR A MOTOR VEHICLE AND POWER DIVIDER THEREFOR

RELATED APPLICATIONS

This application is a divisional of U.S. patent application Ser. No. 11/528,845, filed Sep. 28, 2006, pending, which is a continuation of International application PCT/EP2005/002999, filed Mar. 22, 2005, which claims the benefit of German patent applications DE 10 2004 016 642.0, filed Mar. 30, 2004 and DE 10 2004 009.4, filed Sep. 16, 2004, the entireties of which are hereby incorporated by reference herein.

BACKGROUND OF THE INVENTION

The present invention relates to a drive train for a motor vehicle which has a front axle and a rear axle, of which one is driven constantly and the other is driven as required, with a drive unit which is installed in the motor vehicle transversely at the front and provides drive torque via an output member, the output member being connected to the constantly driven axle, with an angular gear which is arranged in the region of the front axle and is connected to a cardan shaft which serves for transferring drive torque to the rear axle, and with a friction clutch arrangement for cutting in the axle driven as required.

The present invention relates, furthermore, to a power divider for a drive train, with a casing, from which a first and a second drive shaft emerge in the lateral direction and from which a cardan shaft emerges in the longitudinal direction, with an angular gear arranged in the casing and with a friction clutch arrangement which can be actuated by means of a clutch actuator.

In motor vehicles, the four-wheel drive was originally used virtually exclusively in all-terrain vehicles. In recent years, however, even vehicles predominantly designed for road traffic (such as, for example, passenger cars in the form of limousines, station wagons, SUVs) have often been equipped with four-wheel drive, specifically to increase driving safety, particularly also in the case of unfavorable traction conditions.

In vehicles with four-wheel drive, a distinction is generally made between differential-controlled systems and clutch-controlled systems. In differential-controlled systems, the drive torque is apportioned to the front axle and the rear axle from the drive unit by means of a differential. In clutch-controlled systems, generally only one axle is driven and the other axle is driven as required. In this case, in the simplest instance, a manual-shift clutch is provided which is actuated from the passenger interior. However, modern vehicles of this type with four-wheel drive use clutches actuated in an automated way (for example, Haldex clutches) which cut in the second axle when a differential rotational speed builds up or has built up between the axles. These systems are also designated as hang-on systems.

Where differential-controlled systems are concerned, it is known, in the event of the absence of traction, to block the longitudinal differential via a clutch so that torque is transferred to the axle having the higher coefficient of friction.

Where clutch-controlled systems are concerned, there are known systems with hang-on in relation to the rear axle. These are generally vehicles with front-wheel drive, the rear axle being allocated torque in the event of an absence of traction at the front axle.

Such a drive train is installed, for example, in the Audi TT. In this case, in the rear region of the cardan shaft, upstream of the rear-axle differential, a friction clutch arrangement in the form of a Haldex clutch is provided, by means of which the rear axle is cut in as required.

Conversely, systems are also known in which, in general, the rear axle is driven and the front axle is designed as a hang-on axle.

A drive unit is understood in the present context to mean a unit for the provision of drive torque. This may be an engine, such as, for example, an internal combustion engine, or an electric motor, either as such or in combination with a transmission.

The transmission may be a manual-shift multi-step transmission, an automatic converter assembly, a double-clutch transmission, an automated shift transmission, a continuously variable transmission, etc.

A series of concepts is known with regard to power dividers for motor vehicles with four-wheel drive.

For example, from DE 37 21 628 C2 it is known to arrange coaxially with respect to the front axle a transverse differential and a longitudinal differential which are both designed as bevel wheel differentials. In this case, an output of a drive unit transversely installed at the front is connected via a hollow shaft structure to an input member of the longitudinal differential. The latter, in turn, is connected to the outer circumference to a crown wheel of an angular gear which drives a cardan shaft for the rear axle.

Furthermore, it is known from WO 02/28678 A1 to provide coaxially with respect to the front axle a longitudinal and a transverse differential which are designed in each case as planet wheel differentials. The planet wheel differentials are in this case received in a transmission casing. A casing for receiving an angular gear for the output to the rear axle is flanged laterally to the transmission casing.

DE 103 13 386 A1 discloses a further power divider for a drive unit transversely installed at the front. In this case, a longitudinal differential designed as an epicyclic gear is provided, the output member of which is in engagement with a gearwheel of a hollow-shaft stub which is arranged parallel to the front axle. A bevel wheel is secured to another end of the hollow-shaft stub and drives a cardan shaft for the rear axle.

Hang-on systems present the problem of vibrations which are triggered by the friction clutch arrangement for cutting in the axle driven as required. Moreover, as a rule, the power dividers are special structures which are suitable solely for a specific drive train.

SUMMARY OF THE INVENTION

Against this background, the object of the present invention is to specify an improved drive train for a motor vehicle and an improved power divider.

In the drive train initially mentioned for a motor vehicle, this object is achieved in that the friction clutch arrangement is integrated with the angular gear in the region of the front axle.

In the power divider initially mentioned, the above object is achieved in that the casing has a basic casing for receiving the angular gear, a casing cover, flanged to the casing in the lateral direction, for receiving the friction clutch arrangement, and an intermediate casing which is arranged between the basic casing and the casing cover and to which the clutch actuator is secured.

This actuator is preferably operated fluidically, for example hydraulically or pneumatically, but can also be actuated purely mechanically.

In the drive train according to the invention, it is advantageous that the friction clutch arrangement is connected to or integrated with the angular gear. This has a positive effect on the vibrations triggered by the friction clutch arrangement, since the mass to be excited is very much larger. Furthermore, as a rule, markedly lower rotational speeds occur in the angular gear, this having a positive effect on the exciting forces.

In the power divider according to the invention, it is advantageous that the friction clutch arrangement is received in a casing cover flanged on in the lateral direction. A modular change to the power divider is thereby possible in a comparatively simple way. In other words, the power divider is constructed such that a plurality of power divider variants can be implemented with a large number of identical parts and few changes. More specifically, different friction clutch arrangements can be implemented in the power divider.

Consequently, it is correspondingly preferable if, in the drive train according to the invention, the friction clutch arrangement is integrated into a casing of the angular gear.

The object is thus achieved in full.

Furthermore, in the drive train according to the invention, it is advantageous if the friction clutch arrangement is arranged on a side of the angular gear which lies opposite the side on which the output member of the drive unit is arranged.

The construction space available in the region of the front axle can thereby be utilized optimally.

It is particularly advantageous if the front axle is driven constantly.

In this embodiment, therefore, the rear axle is cut in, as required, as a hang-on axle.

In this case, it is particularly advantageous if the output member of the drive unit is connected to an input member of a transverse differential gear, the output members of which are connected respectively to a left and a right side shaft of the front axle.

The transverse differential gear may in this case be integrated in the casing of a transmission of the drive unit, but may also be integrated into a casing of the power divider or angular gear.

The transverse differential gear is in this case preferably designed as a bevel wheel differential, but may also be implemented as a planet wheel differential.

Furthermore, it is in this case advantageous if the friction clutch arrangement is designed as a cut-in clutch for the rear axle, if, furthermore, the input member of the transverse differential gear is connected to a hollow-shaft arrangement which is connected to an input member of the cut-in clutch, and if an output member of the cut-in clutch is connected to the angular gear.

By virtue of the connection between the transverse differential gear and the input member of the cut-in clutch via a hollow-shaft arrangement, the construction space present in the region of the front axle can be utilized optimally.

In this case, it is particularly advantageous if the cut-in clutch is a lamellar clutch and if the input member of the cut-in clutch is an outer lamella carrier.

This is conducive to arranging a hydraulic actuator inside a casing of the angular gear.

Furthermore, it is advantageous in this case if the cut-in clutch is a lamellar clutch, and if the output member of the cut-in clutch is an inner lamella carrier.

This allows a favorable tie-up of the angular gear to the output member (the inner lamella carrier).

Furthermore it is advantageous if the output member of the cut-in clutch is connected to the angular gear via a further hollow-shaft arrangement.

By virtue of this measure, the positioning of the cut-in clutch and the angular gear in the lateral direction may be selected such that the construction space is used optimally. Furthermore, it is possible to arrange a clutch actuator between them.

It is particularly advantageous in this case if the further hollow-shaft arrangement surrounds the first hollow-shaft arrangement which connects the transverse differential gear and the cut-in clutch. A crown wheel of the angular gear can thereby be secured to the further hollow-shaft arrangement in a structurally simple way.

According to an embodiment which is preferred overall, the input member of the transverse differential gear is connected, furthermore, to a hollow-shaft arrangement which is connected to an input member of a transverse blocking clutch, an output member of the transverse blocking clutch being connected to one of the side shafts of the front axle.

In this embodiment, an additional transverse blocking clutch is integrated into the angular gear in a modular way.

The transverse blocking clutch may, in this case, preferably be integrated in the casing of the angular gear, preferably in the casing cover thereof.

It is particularly advantageous if the cut-in clutch and the transverse blocking clutch have a common input member.

This may be, in particular, an outer lamella carrier for two adjacent lamellar clutches.

Furthermore, the transverse blocking clutch may be actuated by means of a clutch actuator which is mounted in the casing cover.

According to an alternative embodiment, preferred overall, of the drive train according to the invention, the rear axle is driven constantly.

Consequently, in this embodiment, the front axle can be cut in as a hang-on axle via a friction clutch arrangement.

It is in this case particularly advantageous if the output member of the drive unit is connected to the angular gear via a hollow-shaft arrangement.

What is achieved thereby is that drive torque is delivered directly to the rear axle constantly by the drive unit.

Furthermore, it is advantageous if the output member of the drive unit is connected to the input member of the friction clutch arrangement which is designed as a cut-in clutch arrangement for the front axle.

In this case, in general, it is possible that the cut-in clutch arrangement for the front axle acts on an input member of a front-axle differential gear. This corresponds to a hang-on system for the front axle.

It is particularly advantageous, however, if the cut-in clutch arrangement is formed by two side friction clutches which can be activated independently of one another, the output members of the two side friction clutches being connected respectively to a left and a right side shaft of the front axle.

It is thereby possible, during cornering, to allocate a higher torque to a front wheel (preferably the front wheel on the outside of the bend) than to the other front wheel. This makes it possible to influence the yawing moment about the vehicle vertical axis, particularly in order, during cornering under sporting conditions, to prevent an understeering driving behavior.

In this case, it is particularly advantageous if the side friction clutches are designed as lamella clutches, and if their common input member is formed by an outer lamella carrier.

This makes it possible in a comparatively simple way to connect the respective inner lamella carriers to the left and the right side shaft of the front axle.

The term "friction clutch" is to be understood in a broad sense in the present context. It may refer, for example, to dry friction clutches, although wet-running lamellar clutches are particularly preferred. However, the term "friction clutch" is also to include alternative clutch systems, such as, for example, magnetic-powder clutches.

It will be appreciated that the features mentioned above and those yet to be explained below may be used not only in the combination specified in each case, but also in other combinations or alone, without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing:

FIG. 1 shows a diagrammatic top view of a drive train according to a first embodiment of the present invention;

FIG. 2 shows a top view of a front part of a drive train according to a further embodiment of the present invention;

FIG. 3 shows a top view of a front part of a drive train according to a further embodiment of the present invention;

DETAILED DESCRIPTION OF THE INVENTION

Figure 4:
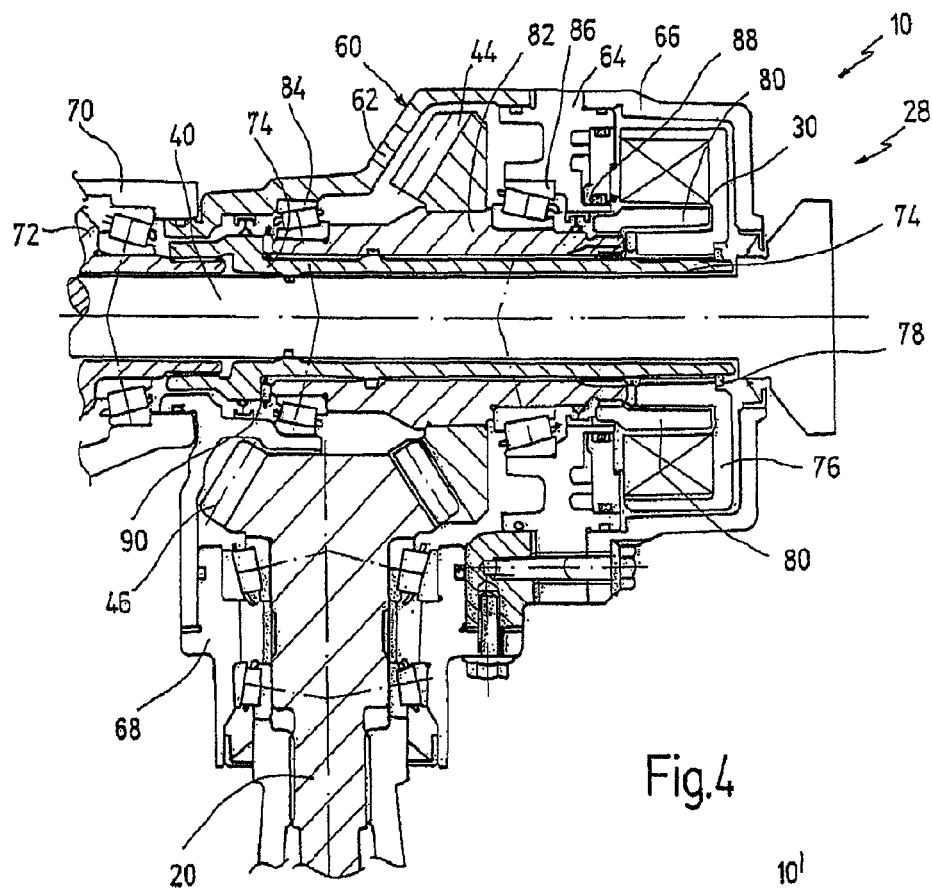
FIG. 4 shows a sectional view through an exemplary embodiment of the structure of a power divider of the drive train of FIG. 1.

In FIG. 1, a first embodiment of the drive train according to the invention is designated in general by 10.

The drive train 10 is implemented in a motor vehicle, more precisely in a passenger car with two driven axles.

The motor vehicle has a front axle VA and a rear axle HA. The left and the right front wheel of the front axle VA are designated respectively by VL and VR. The rear wheels of the rear axle HA are designated respectively by HL and HR.

The drive train 10 has a drive unit 12 which is installed transversely in the region of the front axle VA.

The drive unit 12 has an engine 14, for example, an internal combustion engine, and a transmission 16, for example a manual-shift transmission, a double-clutch transmission, an automated shift transmission, a continuously variable transmission, an automatic transmission, etc.

An output 18 of the drive unit 12 is implemented in the form of a final-drive wheel set, with a first gearwheel which is connected to an output shaft of the transmission 16 and with a gearwheel which meshes therewith and which is arranged coaxially with respect to the front axle.

The drive train 10 has a cardan shaft (output shaft) 20 which connects the front axle VA to a rear-axle differential, in this case a bevel wheel differential 22.

The output members of the bevel wheel differential 22 are connected respectively to a drive shaft 24 for the left rear wheel HL and to a drive shaft 26 for the right rear wheel HR.

In the region of the front axle VA, a power divider 28 is provided for the purpose of distributing the drive torque of the drive unit 12. The power divider 28 contains an angular gear 29 which serves for driving the cardan shaft 20.

Furthermore, the power divider 28 contains a friction clutch arrangement 30 which serves for conducting the drive torque of the drive unit 12 to the rear axle HA, as required.

The power divider 28 has a casing 32 which is flanged laterally to a casing of the transmission 16.

The output 18 of the drive unit 12 is connected to a front-axle differential gear 34. The front-axle differential gear 34 is arranged coaxially with respect to the front axle VA and its output members are connected respectively to a drive shaft 36 for the left front wheel VL and to a drive shaft 40 for the right front wheel VR. More precisely, the front-axle differential gear 34 is designed as a bevel wheel differential gear and is arranged directly adjacently to the output 18, within the transmission casing in the exemplary embodiment illustrated.

Moreover, the input member of the front-axle differential gear 34 is connected via a hollow-shaft arrangement 42 to an input member of the friction clutch arrangement 30. The friction clutch arrangement 30 is arranged with respect to the angular gear 29 such that it lies opposite the output 18 and the front-axle differential gear 34, respectively. The hollow-shaft arrangement 42 in this case passes through the angular gear 29 and is arranged coaxially with respect to the drive shaft 40 for the right front wheel VR.

An output member of the friction clutch arrangement 30 is connected to a crown wheel 44 of the angular gear 29. The crown wheel 44 is provided coaxially with respect to the front axle VA and is in engagement with a bevel wheel 46 of the cardan shaft 20.

The front axle VA is driven constantly via the front-axle differential gear 34 by means of the drive train 10.

The rear axle HA is cut in, as required, specifically by the friction clutch arrangement 30. The rear axle HA is cut in by means of control or regulating algorithms known per se, which, for example, monitor the rotational speeds of the axles VA, HA and cut in the rear axle HA when sufficient traction cannot be achieved on the front axle.

For the sake of a clearer illustration, the details of these regulating algorithms are not dealt with in the present instance.

By virtue of the measure of arranging the friction clutch arrangement in the region of the front axle, in particular, by designing it so as to be integrated with the angular gear 29, various advantages are achieved. Thus, on the one hand, it is not necessary to provide a separate casing for the friction clutch arrangement 30. The rear-axle differential gear 22 may be designed as a conventional rear-axle differential gear. Furthermore, the mass excited by means of the friction clutch arrangement 30 is greater, so that the risk of the build-up of vibrations is lower. Moreover, markedly lower rotational speeds occur in the region of the angular gear 29 (or its input) than in the region of the cardan shaft 20, so that the friction clutch arrangement 30 can operate at lower differential rotational speeds and therefore the problem of unbalance is markedly reduced.

Moreover, with the friction clutch arrangement 30 being arranged at an end lying axially opposite the output 18, it is possible to extend the drive train, and, in particular, its power divider 28 in a modular manner.

One example of this is shown in FIG. 2. FIG. 2 shows an alternative embodiment of a drive train according to the invention which is designated in general by 10'. The drive train 10' is identical to the drive train of FIG. 1 in terms of construction and functioning. Only differences are dealt with below. Identical elements are given the same reference numerals.

In addition to the friction clutch arrangement 30', the drive train 10' has a transverse blocking clutch 48 which acts on the front axle VA (front-axle differential).

The transverse blocking clutch 48 is arranged laterally next to the friction clutch arrangement 30'. It is consequently possible, in spite of the additional reception of such a transverse blocking clutch 48, to leave essential components and subassemblies identically as they are. The transverse blocking clutch 48 can thus be offered in a simple way as an accessory or optional equipment of the motor vehicle. The transverse blocking clutch 48 is in this case inserted between the input member of the friction clutch 30' and the right drive shaft 40'. More precisely, the friction clutch arrangement 30' and the transverse blocking clutch 48 share a common input member in the form of an outer lamella carrier.

FIG. 3 shows a further alternative embodiment of a drive train according to the invention which is designated there in general by 10".

The drive train 10" is in many respects identical to the drive train 10 of FIG. 1. As regards its construction and functioning, therefore, reference is made generally to the description of the drive train 10.

However the drive train 10" differs fundamentally from the drive train 10 of FIG. 1 since, in the drive train 10", the rear axle HA" is driven constantly and the front axle VA" is cut in as required.

The rear axle HA" is constructed, in general, identically to the rear axle HA of the drive train 10 of FIG. 1.

In the region of the front axle VA", the output 18 of the drive unit 12 is connected to a hollow-shaft portion 50. The hollow-shaft portion 50 bridges, within the transmission casing, a space which is otherwise occupied by a front-axle differential. The hollow-shaft portion 50 is in this case connected fixedly in terms of rotation to the hollow-shaft arrangement 42". The hollow-shaft arrangement 42" is connected fixedly in terms of rotation to the crown wheel 44" of the angular gear 29", so that the rear axle HA" is constantly supplied with drive torque by the drive unit 12, via the cardan shaft 20".

To cut in the front axle VA" as required, a friction clutch arrangement 30" is provided, which has a left side friction clutch 52 and a right side friction clutch 54.

The side friction clutches 52, 54 have a common input member which, in the embodiment illustrated, is connected to the crown wheel 44" of the angular gear 29". It is also possible, however, to connect the input member of the side friction clutches 52, 54 constantly to the output 18 of the drive unit 12 in another way.

An output member of the left side friction clutch 52 is connected to the left drive shaft 36" for the left front wheel VL. An output member of the right side friction clutch 54 is connected correspondingly to the right drive shaft 40" for the right front wheel VR.

The side friction clutches 52, 54 can be activated independently of one another. Drive torque can consequently be transferred individually to the front wheels VL, VR.

For example, during cornering, the front wheel on the outside of the bend can be supplied with more drive torque than the wheel on the inside of the bend, in order to prevent understeering.

In order to prevent oversteering, for example, in the event of a load change during cornering, the two side friction clutches 52, 54 may be activated equally or the front wheel on the inside of the bend may be supplied with a higher drive torque.

FIG. 4 shows a structural implementation of the power divider 28 of the drive train 10 of FIG. 1.

The power divider 28 has a casing 60 which is flanged laterally to a transmission casing 70.

More precisely, the casing 60 has a basic casing 62 which receives essentially the angular gear 29. Furthermore the casing 60 has a casing cover 66 and an intermediate casing 64 arranged between the basic casing 62 and the casing cover 66.

Furthermore, the casing 60 has a cardan shaft casing 68, on which the cardan shaft 20 is mounted by means of two rolling bearings (preferably in an O-arrangement).

The basic casing 62 is mounted on the transmission casing 70. A hollow-shaft portion 72, which is connected (not illustrated here) to the front-axle differential 34 and to the output 18, extends as far as the basic casing 62. Mounted within the basic casing 62 is a second hollow-shaft portion 74 connected fixedly in terms of rotation to the first hollow-shaft portion 72, for example, by means of a toothing or the like. The first hollow-shaft portion 72 and the second hollow-shaft portion 74 form the hollow-shaft arrangement 42.

The second hollow-shaft portion 74 extends coaxially with respect to the drive shaft 40 for the right front wheel, specifically through the casing cover 66. In the region of the casing cover 66, the second hollow-shaft portion 74 is connected to an outer lamella carrier 76 of the friction clutch arrangement 30. The outer lamella carrier in this case extends radially adjacently to the casing cover 66 and is directed toward the intermediate casing 64 radially on the outside.

The outer lamella carrier 76 is secured to the second hollow-shaft portion 74 by means of an axial securing device 78.

An inner lamella carrier 80 of the friction clutch arrangement 30 is connected to a carrier sleeve 82 which extends through the intermediate casing 64 into the basic casing 62.

The carrier sleeve 82 is designed as a further hollow shaft and is mounted rotatably on the basic casing 62 and on the intermediate casing 64 respectively by means of a first bearing 84 and a second bearing 86. Since the carrier sleeve 82 is arranged coaxially with respect to the second hollow-shaft portion 74, the bearings 84, 86 also serve for mounting the second hollow-shaft portion 74.

The crown wheel 44 of the angular gear 29 is secured fixedly in terms of rotation to the carrier sleeve 82.

In the intermediate casing 64, a first clutch actuator 88 in the form of a hydraulic actuator is arranged, which is designed for actuating the friction clutch arrangement 30. The clutch actuator 88 in this case acts in a direction laterally outward, toward the casing cover 66.

During an actuation of the clutch actuator 88, the outer lamella carrier 76 is supported on the second hollow-shaft portion 74 via the axle securing device 78.

The second hollow-shaft portion 74 is supported in the axial direction via a needle bearing 90 on the carrier sleeve 82 which is mounted axially via the two bearings 84, 86.

The axial forces exerted in the friction clutch arrangement 30 can thereby be absorbed by the mounting of the crown wheel 44.

Figure 5:
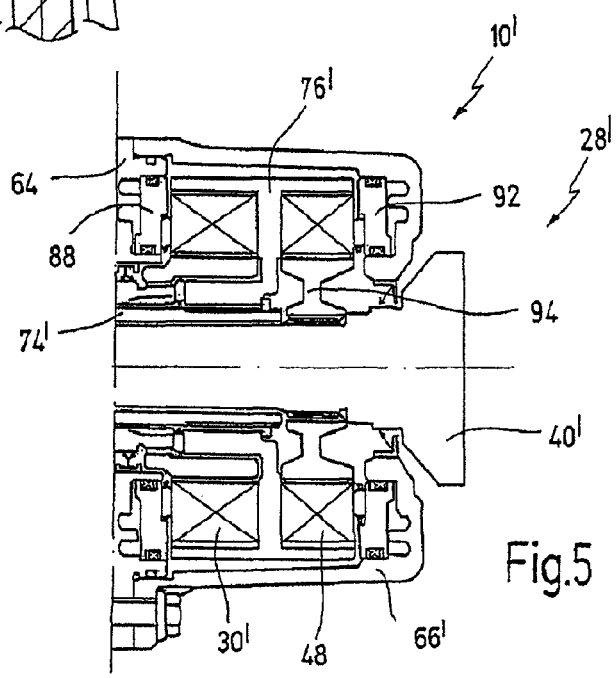
FIG. 5 shows a partial view, corresponding to FIG. 4, of a section through an exemplary embodiment of the structure of a power divider of the drive train of FIG. 2.

FIG. 5 shows a structural implementation of the drive train 10' of FIG. 2, only the differences from the power divider 28 of FIG. 4 being illustrated for the sake of a clearer illustration.

It can be seen that the outer lamella carrier 76' of the power divider 28' not only extends toward the intermediate casing 64 in the radially outer region, but, furthermore, also toward the casing cover 66'.

The casing cover 66' is of prolonged design and not only receives the friction clutch arrangement 30', but also receives the transverse blocking clutch 48 of the front-axle differential 34. Moreover, a second clutch actuator 92 for actuating the transverse blocking clutch 98 is arranged in the casing cover 66'.

An inner lamella carrier 94 of the transverse blocking clutch 48 is connected fixedly in terms of rotation to the drive shaft 40'.

Figure 6:
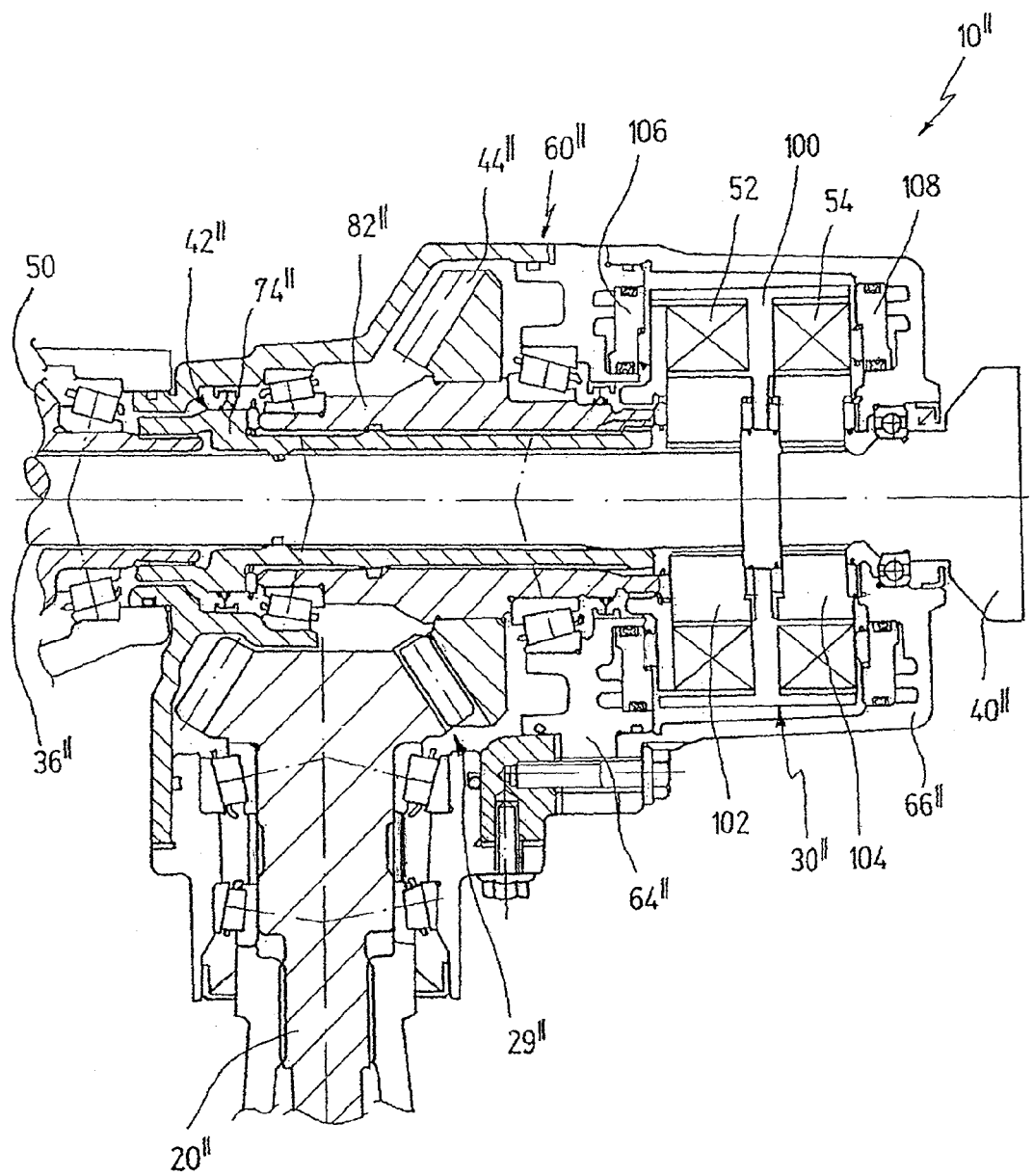
FIG. 6 shows a sectional view through an exemplary embodiment of the structure of a power divider of the drive train of FIG. 3.

FIG. 6 illustrates a structural implementation of the drive train 10" of FIG. 3.

It can be seen that the second hollow-shaft portion 74" is connected fixedly in terms of rotation to the carrier sleeve 82" for the crown wheel 44", so that the rear axle HA" is driven constantly.

Furthermore, an outer lamella carrier 100 of the friction clutch arrangement 30" is connected fixedly in terms of rotation to the carrier sleeve 82".

An inner lamella carrier 102 of the left side friction clutch 52 is connected to the drive shaft 36". An inner lamella carrier 104 of the right side friction clutch 54 is connected to the drive shaft 40".

A first clutch actuator 106 for actuating the left side friction clutch 52 is provided in the intermediate casing 64". A second hydraulic actuator 108 for actuating the right side friction clutch 54 is arranged in the casing cover 66".

It can be seen that the structural embodiments of the three drive trains 10, 10', 10" of FIG. 4 to 6 are in many respects identical and can adopt many identical parts even though functionally different drive trains can be implemented.

A modular power divider with an integrated angular gear and friction clutch arrangement can be implemented in a technically simple way.

What is claimed is:

1. A drive train for a motor vehicle, which has a front axle and a rear axle, of which the front axle is driven constantly and the rear axle is driven as required, with:
    a drive unit which is installed in the motor vehicle transversely at the front and provides drive torque via an output member, the output member being connected to and coaxial with the constantly driven axle;
    an angular gear which is arranged in the region of the front axle and is coaxial with the front axle and is connected to a cardan shaft which serves for transferring drive torque to the rear axle; and
    a friction clutch arrangement for cutting in the axle driven as required;
    wherein the output member of the drive unit is connected to an input member of a transverse differential gear, the output members of which are connected respectively to a left and a right shaft of the front axle,
    wherein the friction clutch arrangement is designed as a cut-in clutch for the rear axle, wherein the input member of the transverse differential gear is connected, furthermore, to a hollow-shaft arrangement which is connected to an input member of the cut-in clutch, and wherein an output member of the cut-in clutch is connected to the angular gear wherein the friction clutch arrangement is arranged on a side of the angular gear which lies opposite the side on which the output member of the drive unit is arranged and wherein the friction clutch arrangement is coaxial with the front axle.

2. The drive train as claimed in claim 1, wherein the cut-in clutch is a lamellar clutch, and wherein the input member of the cut-in clutch is an outer lamellar carrier.

3. The drive train as claimed in claim 1, wherein the cut-in clutch is a lamellar clutch, and wherein the output member of the cut-in clutch is an inner lamellar carrier.

4. The drive train as claimed in claim 1, wherein the output member of the cut-in clutch is connected to the angular gear via a further hollow-shaft arrangement.

5. The drive train as claimed in claim 1, wherein the input member of the transverse differential gear is connected, furthermore, to a hollow-shaft arrangement which is connected to an input member of a transverse blocking clutch, and wherein an output member of the transverse blocking clutch is connected to one of the side shafts of the front axle.

6. The drive train as claimed in claim 5, wherein the friction clutch arrangement is designed as a cut-in clutch for the rear axle, wherein the input member of the transverse differential gear is connected, furthermore, to a hollow-shaft arrangement which is connected to an input member of the cut-in clutch, wherein an output member of the cut-in clutch is connected to the angular gear, and wherein the cut-in clutch and the transverse blocking clutch have a common input member.

* * * * *